(12) United States Patent
Bhatia et al.

(10) Patent No.: US 9,584,528 B2
(45) Date of Patent: Feb. 28, 2017

(54) SECURING DATABASES AGAINST PIRACY ATTACKS

(75) Inventors: Ashok Bhatia, San Diego, CA (US); Ning Shang, San Diego, CA (US); Yafei Yang, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 13/605,805

(22) Filed: Sep. 6, 2012

(65) Prior Publication Data
US 2014/0068778 A1    Mar. 6, 2014

(51) Int. Cl.
*H04L 29/06* (2006.01)
*H04W 4/02* (2009.01)

(52) U.S. Cl.
CPC ............ *H04L 63/107* (2013.01); *H04W 4/02* (2013.01)

(58) Field of Classification Search
CPC ...... H04W 12/06; H04W 4/02; H04L 63/107; H04L 63/0263; H04L 9/0872
See application file for complete search history.

(56) References Cited

U.S. PATENT DOCUMENTS

| | | | |
|---|---|---|---|
| 7,676,218 B2 * | 3/2010 | Ballai ................. | H04L 63/10 380/250 |
| 2006/0145839 A1 | 7/2006 | Sandage | |
| 2006/0203811 A1 * | 9/2006 | Aoki et al. ................... | 370/356 |
| 2007/0030973 A1 * | 2/2007 | Mikan .......................... | 380/270 |
| 2008/0085725 A1 | 4/2008 | Grayson et al. | |
| 2009/0216846 A1 * | 8/2009 | Burroughs et al. .......... | 709/206 |
| 2009/0232311 A1 * | 9/2009 | Meier ................. | H04L 41/0843 380/277 |
| 2010/0041403 A1 * | 2/2010 | Khetawat et al. ......... | 455/435.1 |
| 2010/0205316 A1 * | 8/2010 | Xue ..................... | H04L 63/062 709/229 |
| 2011/0070865 A1 | 3/2011 | Nelson et al. | |
| 2013/0203383 A1 * | 8/2013 | Stopel et al. ................. | 455/411 |
| 2014/0045536 A1 * | 2/2014 | Sydir et al. ................ | 455/456.5 |
| 2014/0067938 A1 * | 3/2014 | Boldyrev .............. | G01S 5/0252 709/204 |

FOREIGN PATENT DOCUMENTS

| | | |
|---|---|---|
| EP | 2482575 A1 | 8/2012 |
| WO | WO0158113 A1 | 8/2001 |

OTHER PUBLICATIONS

International Search Report and Written Opinion—PCT/US2013/051528—ISA/EPO—Oct. 11, 2013.

* cited by examiner

*Primary Examiner* — Kendall Dolly
(74) *Attorney, Agent, or Firm* — Silicon Valley Patent Group LLP

(57) ABSTRACT

A database for location or geographic based services is secured by requiring location based requests to include a unique identifier that identifies the location as well as an authorization identifier associated with the location. The authorization identifier is information that is obtained by being physically present at the location, such as information from access points that are at the location or a position fix when present at the location. The authorization identifier may be non-unique but relatively time-invariant, making such information easily crowdsourced, but difficult to obtain unless physically present at the location. For example, the authorization identifier may be an SSID or a Beacon Frame, or a hash thereof from one or more devices at the location or a position fix.

48 Claims, 4 Drawing Sheets

SECURING DATABASES AGAINST PIRACY ATTACKS

BACKGROUND

Background Field

Embodiments of the subject matter described herein are related generally to generating and using a database for location or geographic based services and, and more particularly securing such databases during generation and use.

Relevant Background

Various location/geographic databases are currently available and/or are in the process of development to provide location-based services. Examples of such databases include, but are not limited to, databases for geographic maps, cell ID, access points (APs) and indoor building maps. Database vendors spend significant efforts and resources to generate and update these databases using various means such as crowdsourcing and war driving efforts.

In order to effectively use such databases to provide meaningful services to mobile devices, a small geographic subset of data from a database is typically downloaded to the mobile device. As mobile devices transition in-and-out of connectivity service, the downloaded geographic subsets of data enable a seamless location service experience for the mobile device user. Thus, the location based servers provide a way for the geographic subsets of data, generally referred to as tiles, to be downloaded from the servers.

The ability to download subsets of data from location based servers, however, places the database at risk of illegal data harvesting. For example, an illegal client, with knowledge of the Client-Server protocol, can access and download all of the tiles from the location based server. Additionally, as the content of the database is often developed using crowdsourcing techniques, another risk is an illegal client uploading malicious content into the database. It should be noted that in this context, the definition of illegal client is rather broad. For example, an authorized mobile device maybe considered an illegal client if using a WLAN access point simulator to illegally download database tiles from a location based server and copy the tiles from local storage. As an example, if a WiFi positioning server allows a client to download the regional access point database by sending a list of nearby access point Media Access Control (MAC) addresses, any illegal client can access and copy this database by constructing one MAC Address. By looping over all the possible MAC Addresses, a client can therefore download an entire access point database from the server.

Several precautions may be taken to prevent an attacker from easily harvesting a database. Nevertheless, most precautions result in simply slowing the process of illegally harvesting a database. One precaution requires client registration to prevent illegal harvesting of a database. However, client registration raises the issue of privacy, i.e., a database vendor is able to track a device based on its identification, making registration a less preferred choice for device authentication.

SUMMARY

A database for location or geographic based services is secured by requiring requests to include a unique identifier that identifies the location as well as an authorization identifier associated with the location. The authorization identifier is information that is obtained by being physically present at the location, such as information from access points that are at the location or a position fix when present at the location. The authorization identifier may be non-unique but relatively time-invariant, making such information easily crowdsourced, but difficult to obtain unless physically present at the location. For example, the authorization identifier may be an SSID or a Beacon Frame, or a hash thereof from one or more devices at the location or a position fix.

In one implementation, a method includes receiving from a mobile device a request that includes a unique identifier for a location that has an entry in a database and an authorization identifier that is associated with the location; using the unique identifier to find the entry for the location in the database; using the authorization identifier to verify that the request is authorized; and transmitting data to the mobile device after verifying that the request is authorized.

In one implementation, an apparatus includes a database that includes entries for locations identified with unique identifiers and authorization identifiers; an external interface capable of communicating with mobile devices to receive a request from a mobile device that includes a unique identifier for a location that has an entry in the database and an authorization identifier that is associated with the location; and a processor configured use the unique identifier to find the entry for the location in the database, use the authorization identifier to verify that the request is authorized; and cause the external interface to transmit data to the mobile device after verifying that the request is authorized.

In one implementation, an apparatus includes means for receiving from a mobile device a request that includes a unique identifier for a location that has an entry in a database and an authorization identifier that is associated with the location; means for using the unique identifier to find the entry for the location in the database; means for using the authorization identifier to verify that the request is authorized; and means for transmitting data to the mobile device after verifying that the request is authorized.

In one implementation, a non-transitory computer-readable medium including program code stored thereon includes program code to receive from a mobile device a request that includes a unique identifier for a location that has an entry in a database and an authorization identifier that is associated with the location; program code to use the unique identifier to find the entry for the location in the database; program code to use the authorization identifier to verify that the request is authorized; and program code to transmit data to the mobile device after verifying that the request is authorized.

In one implementation, a method includes determining a unique identifier for a location and an authorization identifier associated with the location; transmitting a request that includes the unique identifier and the authorization identifier associated with the location; and receiving data from a remote database in response to the request when the remote database has an entry for the location and the authorization identifier associated with the location matches a stored authorization identified in the entry in the database.

In one implementation, a mobile device includes a wireless interface capable of receiving wireless signals while the mobile device is present at a location; and a processor configured to determine from the wireless signals a unique identifier for the location and an authorization identifier associated with the location; transmit with the wireless interface a request to a remote server with a database that that has an entry in a database for the location, the request includes the unique identifier and the authorization identifier associated with the location; and receive data with the wireless interface from the remote server in response to the request when the authorization identifier associated with the location matches a stored authorization identified in the entry in the database.

In one implementation, a mobile device includes means for determining a unique identifier for a location and an authorization identifier associated with the location; means for transmitting a request that includes the unique identifier and the authorization identifier associated with the location; and means for receiving data from a remote database in response to the request when the remote database has an entry for the location and the authorization identifier associated with the location matches a stored authorization identified in the entry in the database.

In one implementation, a non-transitory computer-readable medium including program code stored thereon includes program code to determine a unique identifier for a location and an authorization identifier associated with the location; program code to transmit a request that includes the unique identifier and the authorization identifier associated with the location; and program code to receive data from a remote database in response to the request when the remote database has an entry for the location and the authorization identifier associated with the location matches a stored authorization identified in the entry in the database.

In one implementation, a method of crowdsourcing data includes receiving crowdsourced data for a location for an entry in a database, the crowdsourced data includes a crowdsourced authorization identifier associated with the location; determining that the database includes an entry for the location; determining that a database authorization identifier associated with the location in the database is in a valid state but does not match the crowdsourced authorization identifier; changing a value of the database authorization identifier to a value of the crowdsourced authorization identifier; and changing the database authorization identifier from the valid state to an awaiting validation state, wherein the database authorization identifier is not used for verification of a request when in the awaiting validation state.

In one implementation, an apparatus for crowdsourcing data, the apparatus includes a database that includes entries for locations identified with unique identifiers and authorization identifiers; an external interface capable of communicating with mobile devices to receive crowdsourced data for a location for an entry in the database, the crowdsourced data includes a crowdsourced authorization identifier associated with the location; a processor configured to determine that the database includes an entry for the location; determines that a database authorization identifier associated with the location in the database is in a valid state but does not match the crowdsourced authorization identifier; change a value of the database authorization identifier to a value of the crowdsourced authorization identifier; and change the database authorization identifier from the valid state to an awaiting validation state, wherein the database authorization identifier is not used for verification of a request when in the awaiting validation state.

In one implementation, an apparatus for crowdsourcing data includes means for receiving crowdsourced data for a location for an entry in a database, the crowdsourced data includes a crowdsourced authorization identifier associated with the location; means for determining that the database includes an entry for the location; means for determining that a database authorization identifier associated with the location in the database is in a valid state but does not match the crowdsourced authorization identifier; means for changing a value of the database authorization identifier to a value of the crowdsourced authorization identifier; and means for changing the database authorization identifier from the valid state to an awaiting validation state, wherein the database authorization identifier is not used for verification of a request when in the awaiting validation state.

In one implementation, a non-transitory computer-readable medium including program code stored thereon, includes program code to receive crowdsourced data for a location for an entry in a database, the crowdsourced data includes a crowdsourced authorization identifier associated with the location; program code to determine that the database includes an entry for the location; program code to determine that a database authorization identifier associated with the location in the database is in a valid state but does not match the crowdsourced authorization identifier; program code to change a value of the database authorization identifier to a value of the crowdsourced authorization identifier; and program code to change the database authorization identifier from the valid state to an awaiting validation state, wherein the database authorization identifier is not used for verification of a request when in the awaiting validation state.

DETAILED DESCRIPTION

Figures 1, 2:
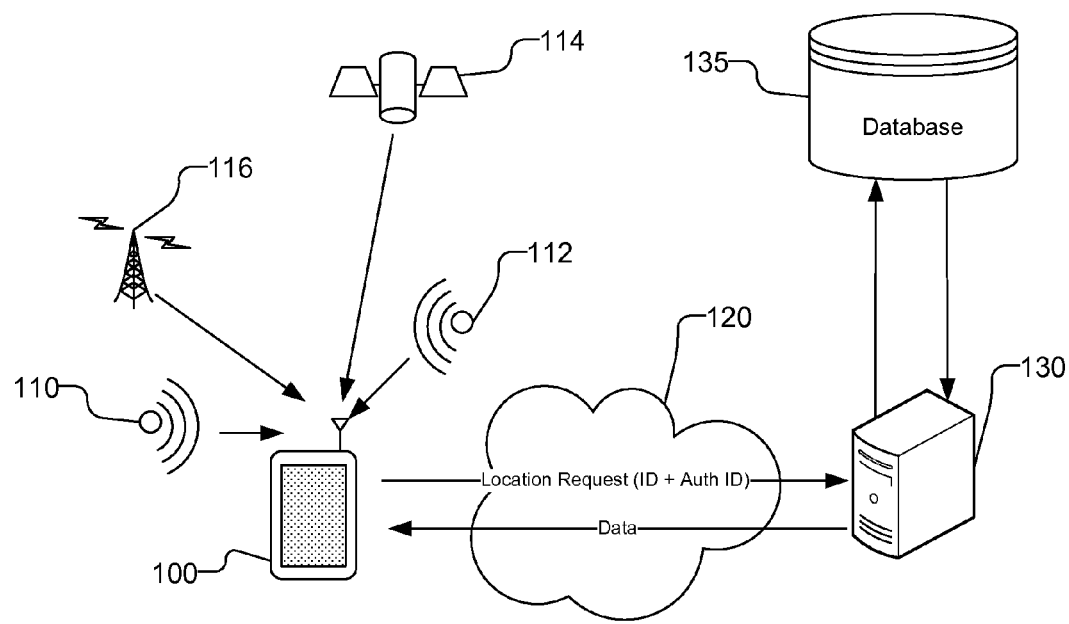
FIG. 1 illustrates a block diagram showing a system for securing a database for location-based services by requiring the use of both a unique identifier and an authorization identifier associated with the location.
FIG. 2 illustrates a format of the database that may be used, which includes the unique identifier and the authorization identifier associated with the location.

FIG. 1 illustrates a block diagram showing a system for securing a database for location-based services by requiring a client, e.g., mobile device 100, to send a location based request that includes both an identifier used to identify an access point 110 to the server 130, as well as an authorization identifier. The authorization identifier is information that is obtained by being physically near the access point 110 and is relatively time-invariant, making such information easily crowdsourced, but at the same time making it difficult for an attacker to generate a correct authorization identifier for a piracy attack.

As illustrated in FIG. 1, while in the presence of the access point 110, the mobile device 100 acquires an identifier for the access point 110 and an authorization identifier related to the access point 110 or the geographic location of the access point 110. The mobile device 100 provides to the remote server 130, via a wireless network 120, the location based request, which includes the identifier (ID) and the authorization identifier (Auth ID). The server 130 locates the entry for the access point 110 in the database 135 using the identifier and verifies that the authorization identifier is associated with the entry for the access point 110. If the authorization identifier is correct, the server 130 may transmit the desired data (e.g., map data, location information, etc.) to the mobile device 100.

The identifier for the access point 110 is a unique identifier, such as the MAC address for the access point 110. For different geographic databases, the unique identifier may be different, including (Latitude, Longitude) pair in some instances. Any other unique identifiers for any geographic database entry may be used if desired.

The authorization identifier may be non-unique information that is readily obtained while in the presence of the access point 110 (or near the same geographic location for which information is being accessed). Thus, the authorization identifier is used to indicate that the mobile device 100 is physically in the presence of the access point 110. For example, the authorization identifier may be information provided by the access point 110 itself, such as the Service Set Identifier (SSID), a hash of the SSID, time invariant parts of the Beacon Frame, a hash of the time invariant parts of the Beacon Frame. Alternatively, the authorization identifier may be information that is not obtained from the access point 110 but is obtained when near the access point 110, such as a list of other access points that are visible when near the access point 110. The authorization identifier may be geographically varying, such as a position fix, e.g., obtained using a satellite positioning system (SPS), or certain cellular system parameters, e.g., from a cellular site that is visible at the same geographic region as the access point 110, etc. Thus, for example, in addition to information obtained from the access point 110 itself, the authorization identifier may be obtained from other devices that are wirelessly visible when mobile device 100 is near the access point 110, such as access point 112, SPS system 114, and/or cellular site 116 shown in FIG. 1. For example, for a WWAN, overhead messages, including Access Parameters, QPCH related information, Registration parameters etc. may be used. Similar to WLAN Beacon Frame, the overhead messages may not be unique to a cell ID, and therefore may not be suitable as the primary key of the database. Nevertheless, the cell ID may be used as a unique identifier and any time invariant overhead parameters or a hash thereof, may be used as the authorization identifier, thereby rendering illegal access to a WWAN database more difficult.

Additionally, a position fix obtained from SPS system 114 may be used as the authorization identifier. An SPS system 114 is a system of transmitters positioned to enable entities to determine their location on or above the Earth based, at least in part, on signals received from the transmitters. In a particular example, such transmitters may be located on Earth orbiting satellite vehicles (SVs), e.g., in a constellation of Global Navigation Satellite System (GNSS) such as Global Positioning System (GPS), Galileo, Glonass or Compass or other non-global systems. Thus, as used herein an SPS may include any combination of one or more global and/or regional navigation satellite systems and/or augmentation systems, and SPS signals may include SPS, SPS-like, and/or other signals associated with such one or more SPS.

FIG. 2 illustrates a format of the database 135 that may be used, which includes the identifier (ID) of the access point, the authorization identifier (Auth ID) associated with the access point or its geographic location, and the data associated with the access point, which may include map data and other information associated with the access point.

The authorization identifier may be non-unique and is therefore not suitable as the primary key of the database, but is useful as evidence that the requesting entity is physical near the access point. The authorization identifier should be relatively time invariant so that it may be relied upon over time for verification of authorization. However, the authorization identifier associated with any access point or its geographic location may change over extended periods of time. For example, the SSID or Beacon Frame associated with an access point may be altered by the owners of the access point. Additionally, the number and/or identifies of other access points visible in the vicinity of the location may change over time. Further, if an access point itself is moved substantially, a position fix associated with the geographic location of the access point may change. Accordingly, continual updating/verification of crowdsourcing data related to the access point may be performed to ensure the validity of the authorization identifier in the server.

The use of a location based request that includes an identifier for the location as well as an authorization identifier that is associated with the location, makes piracy attacks on the location database more expensive, as the authorization identifier requires that an attacker be physically present at the location in the location based request. Thus, to illegally download the entire location database, an attacker must obtain all of the authorization identifiers associated with each different location in the database by being physically present at each different location.

By way of example, assuming the database 135 is a WiFi access point database, in order to access data related to a particular access point a mobile device 100 would transmit a location based request that includes a unique identifier of the access point, e.g., the MAC address, as well as an authorization identifier, e.g., the SSID of the access point. The authorization identifier, e.g., the SSID, may be crowdsourced along with the unique identifier.

Thus, in one example, for all of the access points identified by a mobile device 100 in a location based request, the server 130 will search the database 135 and will disregard any access point in the location based request that has an authorization identifier that does not match the authorization identifier stored in the database. The server 130 may attempt to use the remaining access points in the location based request to determine the location and provide associated data from the database 135 to the mobile device 100. If the number (or ratio) of access points that are disregarded due to a mismatch of the authorization identifier is greater than a threshold, the entire location based request may be disregarded as a suspicious access attempt and a failed response may be returned to the mobile device 100.

Thus, an illegal client attempting to harvest the database cannot simply allow a computer to loop through all the access point MAC addresses to gain access to data for different locations in the database, but must somehow provide the SSID, or other authorization identifier, for each access point MAC address. Consequently, data harvesting becomes impractical.

If desired, the authorization identifier may be something other than the SSID. For example, "time invariant parts of a Beacon Frame, or a hash of the time invariant parts of the entire Beacon Frame or SSID may be used, e.g., using an open hash algorithm. Thus, the hash can be crowdsourced rather than the SSID.

Additionally, it is noted that the SSID of an access point may be changed by the owner, resulting in a potentially varying authorization identifier. Even if a Beacon Frame Hash is used as the authorization identifier, it may be changed as the SSID is part of the Beacon Frame. To avoid the denial of a location based request that is caused by a change in an access point's SSID, denial of a location based requests can be triggered based on the number of access point's with a mismatch of the authorization identifier. For example, the number of access point's with a mismatch of the authorization identifier may be compared to a threshold. Alternatively, a ratio of the number of access points with a mismatch of the authorization identifier relative to the number of access points with matching authorization identifiers (or total access points in the location based request) may be compared to a threshold.

Additionally, it is noted that SSID's may be hidden. When an access point with no SSID is crowdsourced, a default SSID name may be provided and stored in the database. The process would otherwise be the same, where a mobile device 100 would recognize that the access point has a hidden SSID and would include the default SSID in the location based request for verification.

Figure 3:
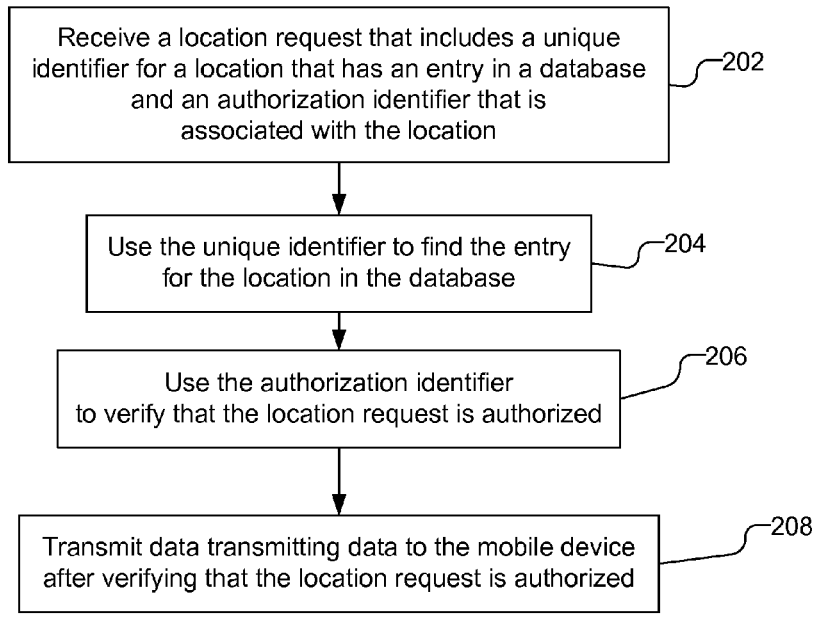
FIG. 3 is a flow chart illustrating a method of verifying that the mobile device is authorized to receive data associated with a location having an entry in a database.

FIG. 3 is a flow chart illustrating a method of verifying that the mobile device 100 is authorized to receive data associated with a location having an entry in a database. The server 130 receives from a mobile device a location based request that includes a unique identifier for a location that has an entry in a database and an authorization identifier that is associated with the location (202). The unique identifier may be, e.g., a MAC address for an access point present at the location or a latitude and longitude pair for the location. The authorization identifier is information obtained while present at the location and may be non-unique. For example, the authorization identifier may be data related to a Service Set Identifier (SSID) or a Beacon Frame or a hash of the SSID or Beacon Frame. The authorization identifier may be data related to at least one access point visible at the location, a position fix when in the physical vicinity of the location, or at least one cellular system parameter received from a cellular site that is visible at the location.

The unique identifier is used to find the entry for the location in the database (204). The authorization identifier is used to verify that the location based request is authorized (206). The presence of the authorization identifier in the location based request indicates that the requesting mobile device is physically in the vicinity of the location and is therefore unlikely to be an attempt to pirate the data. The authorization identifier may be used to verify that the location based request is authorized by comparing the authorization identifier from the location based request to an authorization identifier for the entry of the location in the database. By way of example, where the location based request includes unique identifiers for a plurality of locations with entries in the database, as well as authorization identifiers associated with the locations, the presence of authorization identifiers in the location based request that are not found in the database may be used to determine that the location based request is not authorized. After verifying that the location based request is authorized, data is transmitted to the mobile device (208). For example, map data associated with the location may be transmitted to the mobile device.

Continual updating/validation of the authorization identifiers stored in the database may be performed. For example, if the authorization identifier is derived from access points, the authorization identifier may change if one or more access points SSIDs are altered by the owner. The server 130 should accommodate legitimate changes in authorization identifiers. For example, if one or more location based requests include an invalid authorization identifier for the location, the database entry for that location may be flagged as possibly having an invalid authorization identifier. The authorization identifier stored in the database for that location may be updated, e.g., based on new crowdsourced data, and the new authorization identifier would then require verification, e.g., by receiving multiple location based requests or crowdsourced data for that location with a matching authorization identifier.

Thus, in one example, for any crowdsourced data with the access point SSID included, the server 130 will determine if the database 135 already includes the access point. If the database 135 does not include the access point, a new entry for the access point is created with the SSID and the SSID is marked as being in an "incubation state," i.e., in an awaiting validation state. The server 130 may begin counting how many crowdsourced data messages are received for the access point with matching SSID. When threshold number of crowdsourced data messages is received, the server 130 may flag the SSID as being in a valid state and the access point and SSID may be used for location based requests as discussed above.

If the database 135 does include the access point, but the SSID entry is flagged as being in the incubation state, the server 130 will increase the count for the number of crowdsourced data messages received if the received SSID matches the stored SSID. If the count is greater than a threshold, the server 130 may flag the SSID as being valid. If the received SSID does not match the stored SSID, the server 130 may change the SSID value stored in the database 135 and start over on the count of crowdsourced data messages.

If the database 135 does include the access point with the SSID entry flagged as being valid, and the received crowdsourced SSID does not match the SSID stored in the database, the server 130 may change the SSID value stored in the database 135 and may begin counting how many crowdsourced data messages are received for the access point with matching SSID.

Figure 4:
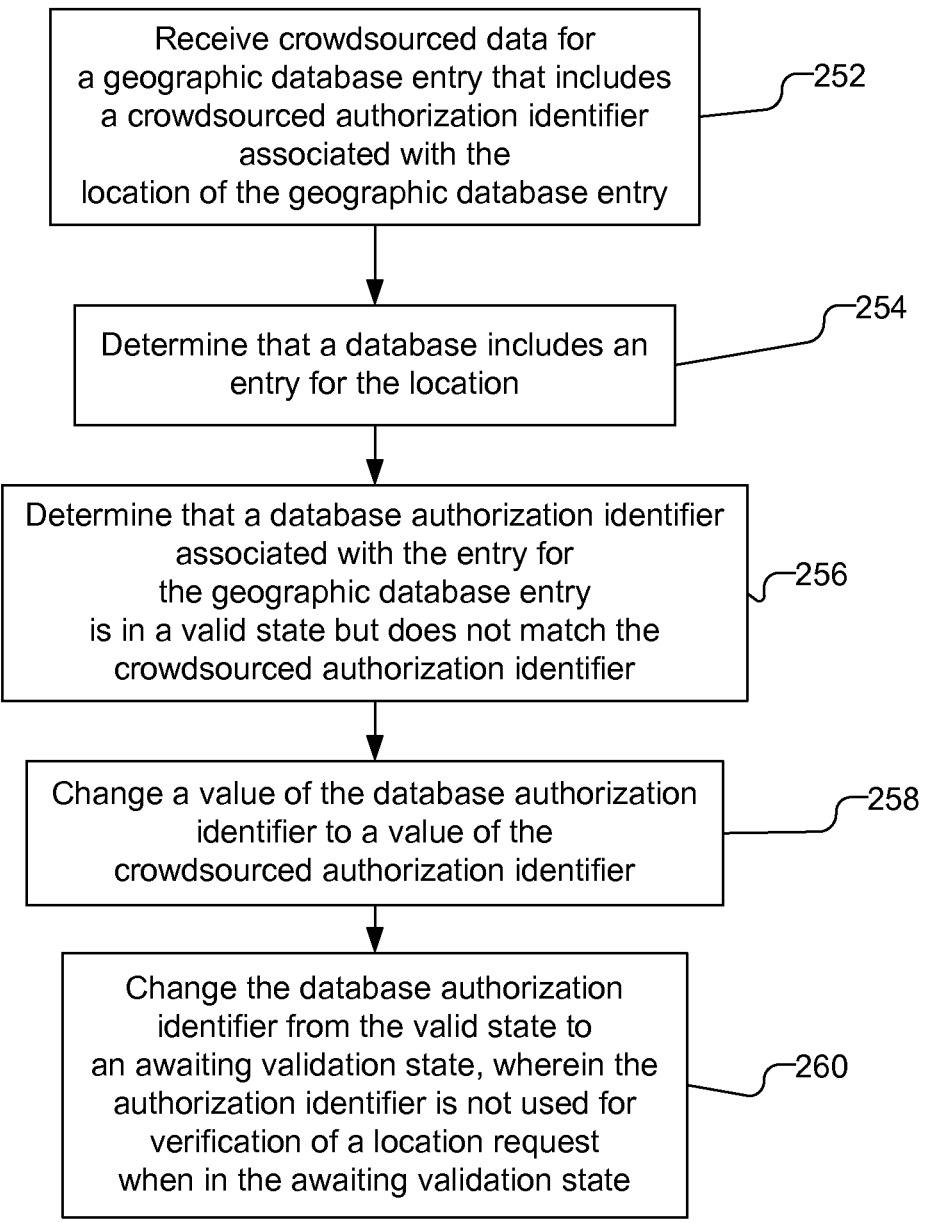
FIG. 4 is a flow chart illustrating a method of validating an authorization identifier stored in a database.

FIG. 4, by way of example, is a flow chart illustrating a method of validating an authorization identifier stored in a database. The server 130 receives crowdsourced data for a location for an entry in a database, where the crowdsourced data includes a crowdsourced authorization identifier associated with the location (252). The server 130 determines that a database includes an entry for the location (254) and determines that a database authorization identifier associated with the location in the database is in a valid state but does not match the crowdsourced authorization identifier (256). A value of the database authorization identifier is changed to a value of the crowdsourced authorization identifier (258). Additionally, the database authorization identifier is changed from the valid state to an awaiting validation state, wherein the authorization identifier is not used for verification of a location based request when in the awaiting validation state (260). The database authorization identifier may be changed from the awaiting validation state to the valid state after receiving a predetermined number of crowdsourced data messages with crowdsourced authorization identifiers that match the database authorization identifier.

Figure 5:
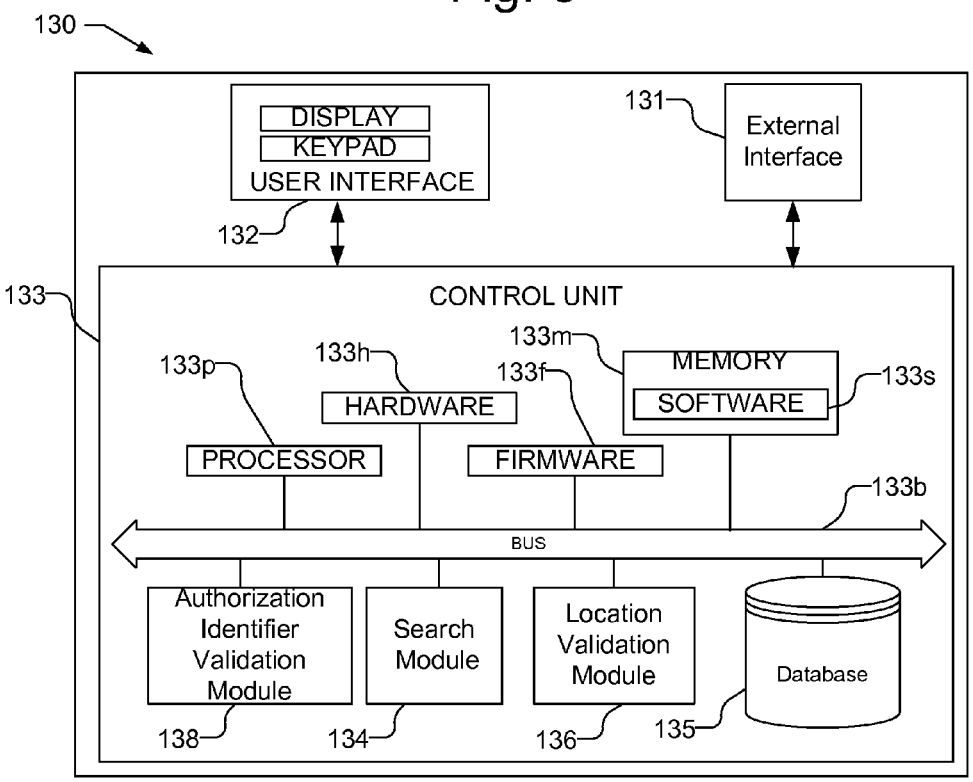
FIG. 5 is a block diagram of a server capable of verifying that a location based request from a mobile device is authorized to receive data based on the presence of an authorization identifier associated with the location for the location based request.

FIG. 5 is a block diagram of the server 130 capable of verifying that a location based request from a mobile device is authorized to receive data based on the presence of an authorization identifier associated with the location for the location based request. The server 130 may also be capable of validating an authorization identifier stored in the database 135. The server 130 includes an external interface 131 that is used to communicate with mobile devices to receive the location based request and transmit data to the mobile devices after verifying that the location based request is authorized. The server 130 may further include a user interface 132 that may include e.g., a display, as well as a keypad or other input device through which the user can input information into the server 130.

The external interface 131 may be a wired interface to a router (not shown) or a wireless interface used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATS) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The server 130 also includes a control unit 133 that is connected to and communicates with the external interface 131. The control unit 133 accepts and processes the location based request from mobile devices. The control unit 133 may be provided by a bus 133*b*, processor 133*p* and associated memory 133*m*, hardware 133*h*, firmware 133*f*, and software 133*s*. The control unit 133 is further illustrated as including a search module 134, which finds entries for locations in the database 135 based on the unique identifiers present in the location based request. Additionally, a verification module 136 is used to verify that the location based request is authorized using the authorization identifier present in the location based request, e.g., by comparing the authorization identifier from the location based request with one or more authorization identifiers stored in the entry for the location in the database 135. The control unit 133 may also include an authorization identifier validation module 138 that flags authorization identifiers stored in the database 135 as awaiting validation and validates the authorization identifiers as discussed above.

The search module 134, verification module 136 and authorization identifier validation module 138 are illustrated separately from processor 133*p* for clarity, but may be part of the processor 133*p* or implemented in the processor based on instructions in the software 133*s* which is run in the processor 133*p*. Moreover, database 135 is illustrated as being within the control unit 133 and coupled directly to bus 133*b*, but may be external to the server 130 if desired.

It will be understood as used herein that the processor 133*p* can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 133*h*, firmware 113*f*, software 133*s*, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 133*m* and executed by the processor 133*p*. Memory 133*m* may be implemented within or external to the processor 133*p*. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the server 130 includes a means for receiving from a mobile device a location based request that includes a unique identifier for a location that has an entry in a database and an authorization identifier that is associated with the location, which may be, e.g., the external interface 131. A means for using the unique identifier to find the entry for the location in the database may be, e.g., the search module 134. A means for using the authorization identifier to verify that the location based request is authorized may be e.g., the location validation module 136. A means for transmitting data to the mobile device after verifying that the location based request is authorized may be the external interface 131. The means for using the authorization identifier to verify that the request is authorized may include means for comparing the authorization identifier from the request to a database authorization identifier in the entry for the location in the database, which may be, e.g., the location validation module 136.

Additionally, the server 130 may include a means for receiving crowdsourced data for a location for an entry in a database, which may be, e.g., the external interface 131. A means for determining that the database includes an entry for the location may be, e.g., the search module 134. A means for determining that a database authorization identifier associated with the location in the database is in a valid state but does not match the crowdsourced authorization identifier may be, e.g., the authorization identifier validation module 138. A means for changing a value of the database authorization identifier to a value of the crowdsourced authorization identifier may be may be, e.g., the authorization identifier validation module 138. A means for changing the database authorization identifier from the valid state to an awaiting validation state, wherein the database authorization identifier is not used for verification of a location based request when in the awaiting validation state, may be, e.g., the authorization identifier validation module 138. A means for changing the database authorization identifier from the awaiting validation state to the valid state after receiving a predetermined number of crowdsourced data messages with crowdsourced authorization identifiers that match the database authorization identifier may be, e.g., the authorization identifier validation module 138.

Figure 6:
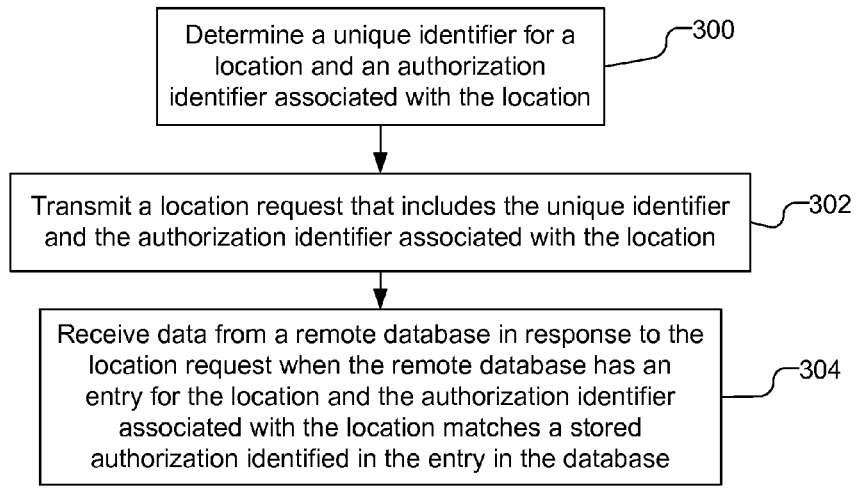
FIG. 6 is a flow chart illustrating a method of a mobile device requesting data from a remote server with verification that the mobile device is authorized to receive the data.

FIG. 6 is a flow chart illustrating a method of a mobile device requesting data from a remote server with verification that the mobile device is authorized to receive the data. The mobile device 100 determines a unique identifier for a location and an authorization identifier associated with the location (300). The mobile device 100 can determine the unique identifier by receiving a message including the unique identifier from an access point associated with the location. The unique identifier may be, e.g., a MAC address for an access point present at the location or a latitude and longitude pair for the location. The authorization identifier may be information obtained while present at the location and may be non-unique. The mobile device 100 can determine the authorization identifier associated with the location by receiving a message including the authorization identifier from an access point associated with the location. The message may include time invariant data, where the authorization identifier is produced using the time invariant data. For example, the authorization identifier may be data related to a Service Set Identifier (SSID) or a Beacon Frame or a hash of the SSID or Beacon Frame. The authorization identifier may be data related to at least one access point visible at the location, a position fix when in the physical vicinity of the location, or at least one cellular system parameter received from a cellular site that is visible at the location. The mobile device 100 can determine the authorization identifier by receiving data from devices that are visible when in the physical vicinity of the location, and using the data to determine the authorization identifier. For example, the data may be identities of access points associated with the location. The data may also or alternatively be e.g., from a satellite positioning system wherein the authorization identifier is a position fix or from a cellular site wherein the authorization identifier is at least one cellular system parameter.

A location based request that includes the unique identifier and the authorization identifier associated with the location is transmitted (302). The mobile device receives data from a remote database in response to the location based request when the remote database has an entry for the location and the authorization identifier associated with the location matches a stored authorization identified in the entry in the database (304).

Figure 7:
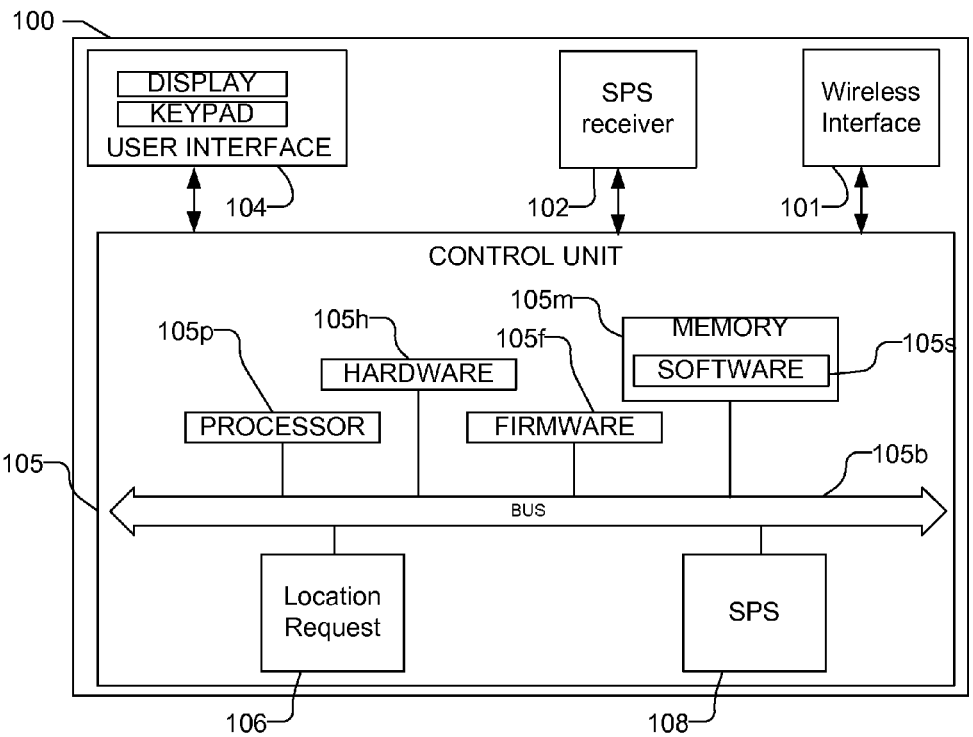
FIG. 7 is a block diagram of a mobile device capable of requesting data from a remote server with verification that the mobile device is authorized to receive the data.

FIG. 7 is a block diagram of a mobile device 100 capable of requesting data from a remote server with verification that the mobile device is authorized to receive the data. The mobile device 100 includes a wireless interface 101 that is used to communicate with a remote server, e.g., to transmit a location based request and in response receive data when an authorization identifier in the location based request matches a stored authorization identifier in the database. The wireless interface 101 may all communicate with, e.g., one or more devices visible at the location, such as access points and/or cellular towers, from which the mobile device 100 can determine a unique identifier for a location that has an entry in the database and an authorization identifier associated with the location. For example, the wireless interface 101 may serve as a cellular receiver that receives cellular signals from a cell site visible at the location, wherein the authorization identifier is at least one cellular system parameter. The mobile device 100 may further include an SPS receiver 102 for receiving position data from SPS 114, which may be used to determine a position fix that may be used as the authorization identifier. The mobile device 100 may further include a user interface 104 that may include e.g., a display, as well as a keypad or other input device through which the user can input information into the mobile device 100.

The wireless interface 101 may be used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The mobile device 100 also includes a control unit 105 that is connected to and communicates with the wireless interface 101 and SPS receiver 102. The control unit 105 accepts and processes data obtained from wireless interface 101 and SPS receiver 102 and causes the wireless interface 101 to transmit a location based request including a unique identifier for a location that has an entry in a database and an authorization identifier associated with the location. The control unit 105 may be provided by a bus 105b, processor 105p and associated memory 105m, hardware 105h, firmware 105f, and software 105s. The control unit 105 is further illustrated as including location based request module 106 that determines a unique identifier and authorization identifier for a location and generates a location based request that is transmitted via wireless interface 101. The control unit 105 may include an SPS module 108 that receives data from the SPS receiver 102 to determine a position fix, which may be used by the location based request module 106 as the authorization identifier.

The location based request module 106 and SPS module 108 are illustrated separately from processor 105*p* for clarity, but may be part of the processor 105*p* or implemented in the processor based on instructions in the software 105*s* which is run in the processor 105*p*. It will be understood as used herein that the processor 105*p* can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105*h*, firmware 113*f*, software 105*s*, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105*m* and executed by the processor 105*p*. Memory 105*m* may be implemented within or external to the processor 105*p*. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the mobile device 100 includes a means for determining a unique identifier for a location that has an entry in a database and an authorization identifier associated with the location, which may be, e.g., the wireless interface 101 and/or SPS receiver 102 with SPS module 108 and the location based request module 106. A means for transmitting a location based request that includes the unique identifier and the authorization identifier associated with the location may be the location based request module 106 and the wireless interface 101. A means for receiving data from a remote database in response to the location based request when the authorization identifier associated with the location matches a stored authorization identified in the entry in the database may be, e.g., the wireless interface 101.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   receiving from a mobile device a request for a location based service, wherein the request includes a unique identifier for a location that has an entry in a database and an authorization identifier that is associated with the location and that is obtained by the mobile device when physically present at the location;
   using the unique identifier to find the entry for the location in the database;
   using the authorization identifier to verify that the request is authorized, wherein using the authorization identifier to verify that the request is authorized comprises comparing the authorization identifier from the request to a database authorization identifier in the entry for the location in the database; and
   executing the location based service only after verifying that the request is authorized comprising transmitting location based service data associated with the location in the entry in the database to the mobile device.

2. The method of claim 1, wherein the authorization identifier is obtained by the mobile device while present at the location.

3. The method of claim 1, wherein the authorization identifier comprises data related to a Service Set Identifier (SSID) or a Beacon Frame or a hash of the SSID or the Beacon Frame.

4. The method of claim 1, wherein the authorization identifier comprises at least one of data related to at least one access point visible at the location, a position fix when in the physical vicinity of the location, and at least one system parameter received from a cellular site that is visible at the location.

5. The method of claim 1, wherein the request includes unique identifiers for a plurality of locations with entries in the database and authorization identifiers associated with the plurality of locations, wherein using the authorization identifier to verify that the request is authorized comprises using a number of authorization identifiers that are not found in the database to determine that the request is not authorized.

6. The method of claim 1, wherein transmitting the location based service data comprises transmitting map data associated with the location in the entry in the database.

7. The method of claim 1, wherein the unique identifier for the location comprises a Media Access Control (MAC) address for an access point or a latitude and longitude pair.

8. An apparatus comprising:
a database that includes entries for locations identified with unique identifiers and authorization identifiers;
an external interface capable of communicating with mobile devices to receive a request for a location based service from a mobile device, wherein the request includes a unique identifier for a location that has an entry in the database and an authorization identifier that is associated with the location and that is obtained by the mobile device when physically present at the location; and
a hardware processor executing instructions to use the unique identifier to find the entry for the location in the database, use the authorization identifier to verify that the request is authorized; and execute the location based service only after verifying that the request is authorized comprising causing the external interface to transmit location based service data associated with the location in the entry in the database to the mobile device, wherein the hardware processor executes instructions to use the authorization identifier to verify that the request is authorized by being configured to compare the authorization identifier from the request to a database authorization identifier in the entry for the location in the database.

9. The apparatus of claim 8, wherein the authorization identifier comprises data related to a Service Set Identifier (SSID) or a Beacon Frame or a hash of the SSID or the Beacon Frame.

10. The apparatus of claim 8, wherein the authorization identifier comprises at least one of data related to at least one access point visible at the location, a position fix when in the physical vicinity of the location, and at least one system parameter received from a cellular site that is visible at the location.

11. The apparatus of claim 8, wherein the request includes unique identifiers for a plurality of locations with entries in the database and authorization identifiers associated with the plurality of locations, wherein the hardware processor executes instructions to use the authorization identifier to verify that the request is authorized by being configured to use a number of authorization identifiers that are not found in the database to determine that the request is not authorized.

12. The apparatus of claim 8, wherein the data transmitted to the mobile device comprises map data map data associated with the location in the entry in the database.

13. The apparatus of claim 8, wherein the unique identifier for the location comprises a Media Access Control (MAC) address for an access point or a latitude and longitude pair.

14. The apparatus of claim 8, wherein the instructions are included on a non-transitory computer-readable storage medium.

15. An apparatus comprising:
means for receiving from a mobile device a request for a location based service, wherein the request includes a unique identifier for a location that has an entry in a database and an authorization identifier that is associated with the location and that is obtained by the mobile device when physically present at the location
means for using the unique identifier to find the entry for the location in the database;
means for using the authorization identifier to verify that the request is authorized, wherein the means for using the authorization identifier to verify that the request is authorized comprises means for comparing the authorization identifier from the request to a database authorization identifier in the entry for the location in the database; and
means for executing the location based service only after verifying that the request is authorized comprising transmitting location based service data associated with the location in the entry in the database to the mobile device.

16. The apparatus of claim 15, wherein the authorization identifier comprises data related to a Service Set Identifier (SSID) or a Beacon Frame or a hash of the SSID or the Beacon Frame.

17. The apparatus of claim 15, wherein the authorization identifier comprises at least one of data related to at least one access point visible at the location, a position fix when in the physical vicinity of the location, and at least one system parameter received from a cellular site that is visible at the location.

18. The apparatus of claim 15, wherein the request includes unique identifiers for a plurality of locations with entries in the database and authorization identifiers associated with the plurality of locations, wherein the means for using the authorization identifier to verify that the request is authorized uses a number of authorization identifiers that are not found in the database to determine that the request is not authorized.

19. A non-transitory computer-readable storage medium storing a program of instructions that when executed by a processor cause the processor to:
receive from a mobile device a request for a location based service, wherein the request includes a unique identifier for a location that has an entry in a database and an authorization identifier that is associated with the location and that is obtained by the mobile device when physically present at the location;
use the unique identifier to find the entry for the location in the database;
use the authorization identifier to verify that the request is authorized, wherein the processor is caused to use the authorization identifier to verify that the request is authorized by being caused to compare the authorization identifier from the request to a database authorization identifier in the entry for the location in the database; and
execute the location based service only after verifying that the request is authorized comprising transmitting location based service data associated with the location in the entry in the database to the mobile device.

20. The non-transitory computer-readable storage medium of claim 19, wherein the authorization identifier comprises data related to a Service Set Identifier (SSID) or a Beacon Frame or a hash of the SSID or the Beacon Frame.

21. The non-transitory computer-readable storage medium of claim 19, wherein the authorization identifier comprises at least one of data related to at least one access point visible at the location, a position fix when in the physical vicinity of the location, and at least one system parameter received from a cellular site that is visible at the location.

22. The non-transitory computer-readable storage medium of claim 19, the request includes unique identifiers for a plurality of locations with entries in the database and authorization identifiers associated with the plurality of locations, wherein the processor is caused to use the authorization identifier to verify that the request is authorized by being caused to use a number of authorization identifiers that are not found in the database to determine that the request is not authorized.

23. A method comprising:
determining a unique identifier for a location and an authorization identifier associated with the location and that is obtained when physically present at the location;
transmitting a request for a location based service to a remote server with a database, wherein the request includes the unique identifier and the authorization identifier associated with the location; and
executing the location based service only after the remote server verifies that the request is authorized comprising receiving location based service data associated with the location from the remote server, the remote server verifies that the request for the location based service is authorized only when the database has an entry for the location and the authorization identifier associated with the location matches a stored authorization identified in the entry in the database.

24. The method of claim 23, wherein the authorization identifier comprises data related to a Service Set Identifier (SSID) or a Beacon Frame or a hash of the SSID or the Beacon Frame.

25. The method of claim 23, wherein the authorization identifier comprises at least one of data related to at least one access point visible at the location, a position fix when in the physical vicinity of the location, and at least one system parameter received from a cellular site that is visible at the location.

26. The method of claim 23, wherein determining the unique identifier for the location comprises receiving a message including the unique identifier from an access point associated with the location.

27. The method of claim 23, wherein determining the authorization identifier associated with the location comprises receiving a message including the authorization identifier from an access point associated with the location.

28. The method of claim 23, wherein determining the authorization identifier for the location comprises receiving a message including time invariant data from an access point associated with the location and producing the authorization identifier using the time invariant data.

29. The method of claim 23, wherein determining the authorization identifier for the location comprises receiving data from devices that are visible when in the physical vicinity of the location, and using the data to determine the authorization identifier.

30. The method of claim 29, wherein the data from devices that are visible comprises identities of access points associated with the location.

31. The method of claim 29, wherein the data from devices that are visible is from at least one of a satellite positioning system wherein the authorization identifier is a position fix and a cellular site wherein the authorization identifier is a at least one system parameter.

32. The method of claim 23, wherein the unique identifier for the location comprises a Media Access Control (MAC) address for an access point or a latitude and longitude pair.

33. A mobile device comprising:
a wireless interface capable of receiving wireless signals while the mobile device is present at a location; and
a hardware processor executing instructions to determine from the wireless signals a unique identifier for the location and an authorization identifier associated with the location and that is obtained when physically present at the location; transmit with the wireless interface a request for a location based service to a remote server with a, the request includes the unique identifier and the authorization identifier associated with the location; and execute the location based service only after the remote server verifies that the request is authorized comprising receiving with the wireless interface location based service data associated with the location from the remote server in response to the request for the location based service, the remote server verifies that the request for location based services is authorized only when the authorization identifier associated with the location matches a stored authorization identified in the entry in the database.

34. The mobile device of claim 33, wherein the authorization identifier comprises data related to a Service Set Identifier (SSID) or a Beacon Frame or a hash of the SSID or the Beacon Frame.

35. The mobile device of claim 33, wherein the authorization identifier comprises at least one of data related to at least one access point visible at the location, a position fix when in the physical vicinity of the location, and at least one system parameter received from a cellular site that is visible at the location.

36. The mobile device of claim 33, wherein the wireless signals comprise a message including the unique identifier and the authorization identifier from an access point associated with the location.

37. The mobile device of claim 33, wherein the wireless interface comprises a satellite positioning system receiver, and the wireless signals are data from a satellite positioning system and the authorization identifier is a position fix.

38. The mobile device of claim 33, wherein the wireless interface comprises a cellular receiver, and the authorization identifier is at least one system parameter.

39. The mobile device of claim 33, wherein the unique identifier for the location comprises a Media Access Control (MAC) address for an access point or a latitude and longitude pair.

40. The mobile device of claim 33, wherein the instructions are included on a non-transitory computer-readable storage medium.

41. A mobile device comprising:
means for determining a unique identifier for a location and an authorization identifier associated with the location and that is obtained when physically present at the location;
means for transmitting a request for a location based service to a remote server with a database, wherein the request includes the unique identifier and the authorization identifier associated with the location; and
means for executing the location based service only after the remote server verifies that the request is authorized comprising receiving location based service data associated with the location from the remote server, the remote server verifies that the request for the location based service is authorized only when the database has an entry for the location and the authorization identifier associated with the location matches a stored authorization identified in the entry in the database.

42. The mobile device of claim 41, wherein the authorization identifier comprises data related to a Service Set Identifier (SSID) or a Beacon Frame or a hash of the SSID or the Beacon Frame.

43. The mobile device of claim 41, wherein the authorization identifier comprises at least one of data related to at least one access point visible at the location, a position fix when in the physical vicinity of the location, and at least one system parameter received from a cellular site that is visible at the location.

44. The mobile device of claim 41, wherein the unique identifier for the location comprises a Media Access Control (MAC) address for an access point or a latitude and longitude pair.

45. A non-transitory computer-readable storage medium storing a program of instructions that when executed by a processor cause the processor to:
   determine a unique identifier for a location and an authorization identifier associated with the location and that is obtained when physically present at the location;
   transmit a request for a location based service to a remote server with a database, wherein the request includes the unique identifier and the authorization identifier associated with the location; and
   execute the location based service only after the remote server verifies that the request is authorized comprising receiving location based service data associated with the location from the remote server, the remote server verifies that the request for the location based service is authorized only when the remote database has an entry for the location and the authorization identifier associated with the location matches a stored authorization identified in the entry in the database.

46. The non-transitory computer-readable storage medium of claim 45, wherein the authorization identifier comprises data related to a Service Set Identifier (SSID) or a Beacon Frame or a hash of the SSID or the Beacon Frame.

47. The non-transitory computer-readable storage medium of claim 45, wherein the authorization identifier comprises at least one of data related to at least one access point visible at the location, a position fix when in the physical vicinity of the location, and at least one system parameter received from a cellular site that is visible at the location.

48. The non-transitory computer-readable storage medium of claim 45, wherein the unique identifier for the location comprises a Media Access Control (MAC) address for an access point or a latitude and longitude pair.

* * * * *